United States Patent
Lee et al.

(10) Patent No.: US 9,451,182 B2
(45) Date of Patent: Sep. 20, 2016

(54) METHOD AND APPARATUS FOR AUTOMATIC EXPOSURE DETECTION IN X-RAY DETECTOR

(71) Applicant: SAMSUNG ELECTRONICS CO., LTD., Suwon (KR)

(72) Inventors: Kyung-soo Lee, Suwon (KR); Eung-bum Kim, Suwon (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 165 days.

(21) Appl. No.: 14/256,401

(22) Filed: Apr. 18, 2014

(65) Prior Publication Data

US 2014/0376695 A1    Dec. 25, 2014

(30) Foreign Application Priority Data

Jun. 21, 2013   (KR) .................. 10-2013-0071953

(51) Int. Cl.
   *H05G 1/56*   (2006.01)
   *H04N 5/32*   (2006.01)
   *G01T 1/20*   (2006.01)
   *H04N 5/232*  (2006.01)

(52) U.S. Cl.
   CPC ............... *H04N 5/32* (2013.01); *G01T 1/2008* (2013.01); *H04N 5/232* (2013.01)

(58) Field of Classification Search
   CPC ........ H04N 5/32; A61B 6/42; A61B 6/4208; A61B 6/4216; A61B 6/4233; A61B 6/54; A61B 6/542; G01T 1/2928; G01T 1/2018; G01T 1/24; H05G 1/56; H05G 1/58; H05G 1/60

USPC ........... 378/98.8, 114, 116; 250/370.09, 371
   See application file for complete search history.

(56) References Cited

U.S. PATENT DOCUMENTS

| 8,476,593 B2 | 7/2013 | Degenhardt et al. |
| 8,488,736 B2 | 7/2013 | Hoffman et al. |
| 9,063,239 B2* | 6/2015 | Oda ................... G01T 1/24 |
| 2007/0040125 A1 | 2/2007 | Sato et al. |
| 2012/0161017 A1 | 6/2012 | Kimura |

FOREIGN PATENT DOCUMENTS

| JP | 2004-271333 | 9/2004 |
| JP | 2012-125573 | 7/2012 |

(Continued)

OTHER PUBLICATIONS

Korean Office Action dated Mar. 2, 2015 in corresponding Korean Patent Application No. 10-2013-0071953.

(Continued)

*Primary Examiner* — Jurie Yun
(74) *Attorney, Agent, or Firm* — Staas & Halsey LLP

(57) ABSTRACT

Provided are a wireless x-ray detector for automatic exposure detection and a method of driving the x-ray detector. The wireless x-ray detector includes: a first detection unit for detecting an x-ray incident in the x-ray detector; a second detection unit for detecting an x-ray that has passed through the first detection unit; and a gate driving unit for applying a gate pulse for controlling a switching device of the first detection unit, to the first detection unit, according to whether the second detection unit detects the x-ray that has passed through the first detection unit.

24 Claims, 8 Drawing Sheets

(56) References Cited

FOREIGN PATENT DOCUMENTS

| | | |
|---|---|---|
| JP | 2012-529032 | 11/2012 |
| KR | 10-2012-0071197 | 7/2012 |

OTHER PUBLICATIONS

Korean Notice of Allowance issued Mar. 25, 2016 in corresponding Korean Patent Application 10-2013-0071953.

* cited by examiner

METHOD AND APPARATUS FOR AUTOMATIC EXPOSURE DETECTION IN X-RAY DETECTOR

CROSS-REFERENCE TO RELATED APPLICATIONS

This application claims the benefit of Korean Patent Application No. 10-2013-0071953, filed on Jun. 21, 2013, in the Korean Intellectual Property Office, the disclosures of which is incorporated herein in its entirety by reference.

BACKGROUND

1. Field

One or more embodiments of the present invention relate to a method and apparatus for x-ray detection in an x-ray detector.

2. Description of the Related Art

For an x-ray detector to detect an x-ray, wired x-ray detectors perform synchronization by being connected by wire with a high voltage power supply (HVPS). If an x-ray exposure request signal is input, an x-ray tube and the HVPS are placed on standby to irradiate an x-ray. Once the pre-heating of the x-ray tube is finished, and the signal indicating readiness of the x-ray detector is transmitted to the HVPS, the HVPS shoots the x-ray, and the x-ray generating process is completed.

In a case of a wireless x-ray detector, the above process is performed through wireless communication. In the case of the wireless x-ray detector, the x-ray detector and the HVPS are connected wirelessly, thus the location and the movement of the x-ray detector are not restricted.

However, when the synchronization between the detector and the HVPS is performed through communication, according to related art methods, the synchronization between the x-ray detector and the HVPS may not be performed perfectly, due to a delay in the communication. In addition, during the synchronization, a time delay may occur. Therefore, a method of detection of an x-ray detector, in which a synchronization process is not necessary between the wireless x-ray detector and the HVPS, is required

SUMMARY

One or more embodiments of the present invention include a method and apparatus for automatic exposure detection in an x-ray detector.

Additional aspects will be set forth in part in the description which follows and, in part, will be apparent from the description, or may be learned by practice of the presented embodiments.

According to one or more embodiments of the present invention, an x-ray detector includes a first detection unit for detecting an x-ray incident in the x-ray detector, a second detection unit for detecting an x-ray that has passed through the first detection unit, and a gate driving unit for applying a gate pulse for controlling a switching device of the first detection unit, to the first detection unit, according to whether the second detection unit detects the x-ray that has passed through the first detection unit.

The second detection unit is placed on the back of the first detection unit, and has a same center position as that of the first detection unit.

The second detection unit detects an x-ray having a higher average energy than an x-ray detected by the first detection unit.

When the second detection unit detects the x-ray that has passed through the first detection unit, the gate driving unit applies a gate pulse for turning off the switching device.

When the second detection unit does not detect the x-ray that has passed through the first detection unit, the gate driving unit applies a gate pulse for turning on the switching device.

The first detection unit includes a plurality of light detection devices, and the gate driving unit applies the gate pulse to the plurality of light detection devices within a predetermined critical time.

The x-ray detector receives a detection signal output from the first detection unit, and further includes a data processing unit for generating an x-ray image, based on the detection signal.

The first detector includes a first scintillator and the second detector includes a second scintillator which is thicker than the first scintillator.

The data processing unit performs an afterimage annihilation algorithm for the x-ray image.

The second detection unit includes a plurality of light detection devices, and the light detection devices further include a silicon photo multiplier (SiPM).

The second detection unit includes a solid state photo multiplier tube.

According to one or more embodiments of the present invention, a method of driving an x-ray detector includes detecting an x-ray that has passed through a first detection unit for detecting an x-ray incident in the x-ray detector, and controlling a gate pulse applied to the first detection unit, as the x-ray that has passed through the first detection unit is detected.

According to one or more embodiments of the present invention, an x-ray detector includes a first detection unit for detecting an x-ray incident in the x-ray detector, a second detection unit for detecting an x-ray that has passed through the first detection unit, a bias circuit for applying a driving voltage to the first detection unit, a read-out circuit for receiving a detection signal output from the first detection unit, and a gate driving unit for applying a gate pulse for controlling a switching device of the first detection unit, to the first detection unit, according to whether the second detection unit detects the x-ray that has passed through the first detection unit.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
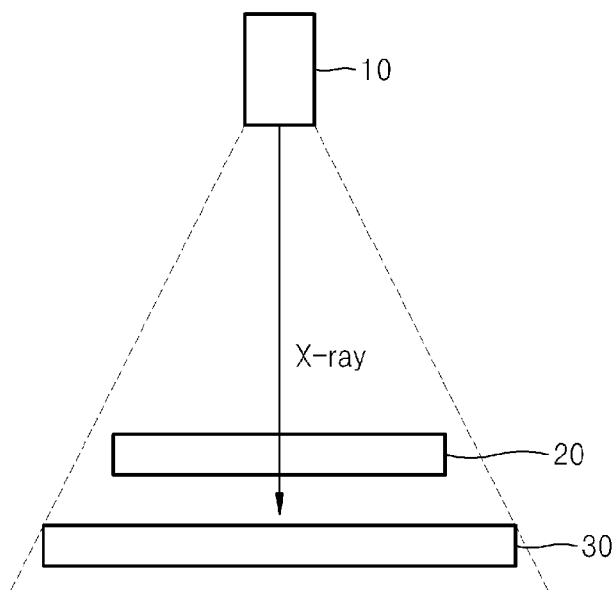
FIG. 1 is a view illustrating a method of exposure detection in an x-ray detector.

Reference will now be made in detail to the embodiments, examples of which are illustrated in the accompanying drawings, wherein like reference numerals refer to the like elements throughout. The embodiments are described below to explain the present invention by referring to the figures.

All terms (including technical and scientific terms) used herein have the same meaning as commonly understood by one of ordinary skill in the art to which the exemplary embodiments belong. Further, the meaning of terms or words used in the specification and the claims should not be limited to the literal or commonly employed sense, but should be construed in accordance with the spirit of the invention to most properly describe the present invention.

The terminology used herein is for the purpose of describing particular embodiments only and is not intended to be limiting of the exemplary embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof.

In this specification, an "image or video" may refer to multi-dimensional data composed of discrete image factors (for example, pixels of two-dimensional images, voxels of three-dimensional images, etc.). For example, an image may include a medical image of an object obtained by an x-ray diagnosis system.

Also, in this specification, an "object" may include people or animals, or a part of people or animals. For example, an object may include organs, such as a liver, heart, uterus, brain, breast, and abdomen, or blood vessels. Also, the "object" may include a phantom. A phantom refers to a material having a volume that is very close to a density and effective atomic number of an organism a, and may include a spherical phantom having similar properties to a physical body.

Moreover, the term "user" used herein is a medical expert, and may be a doctor, a nurse, a medical technologist, a medical image expert, or the like, or may be an engineer who repairs a medical apparatus but it is not limited thereto.

Hereinafter, embodiments of the present invention will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those of ordinary skill in the art. In the drawings, lengths and sizes of layers and regions may be exaggerated for clarity. Expressions such as "at least one of," when preceding a list of elements, modify the entire list of elements and do not modify the individual elements of the list.

Hereinafter, one or more embodiments of the present invention will be described more fully with reference to the accompanying drawings.

FIG. 1 is a view illustrating a method of exposure detection in an x-ray detector.

FIG. 1 illustrates an x-ray generator 10, an object 20, and an x-ray detector 30. An x-ray generated in the x-ray generator 10 reaches the x-ray detector 30 after passing through the object 20.

The x-ray generator 10 is a device for generating an x-ray that passes through the object 20. Generation of an x-ray involves a supply of electrons, an acceleration of electrons, and rapid blocking of the accelerated electrons. The x-ray generator 10 is composed of a cathode for supplying electrons, a high-voltage generator for accelerating electrons, and an anti-cathode for rapidly blocking the accelerated electrons. Since the anti-cathode reaches a high temperature due to some portion of energy of the accelerated electrons being turned into heat, tungsten (W) is generally used, and the x-ray generator 10 may further include a unit for cooling the cathode.

The x-ray detector 30 may be a type that detects an x-ray by detecting amplified fluorescence, that is, an amplification of a fluorescent material generated by irradiation of the x-ray onto the material, or may be a type that detects an x-ray by detecting an ion pair, generated within gas by irradiating the x-ray, or by detecting an electron and positive pole pair, generated within a semiconductor by irradiating the x-ray. Also, the type that detects the x-ray by using gas ionization, performed by irradiating the x-ray, includes a scintillation detector using light-emission that occurs due to the x-ray irradiation, and a semiconductor radiation detector. A scintillator that is used for the scintillation detector may include NaI (T1) or CsI (T1).

Figure 2:
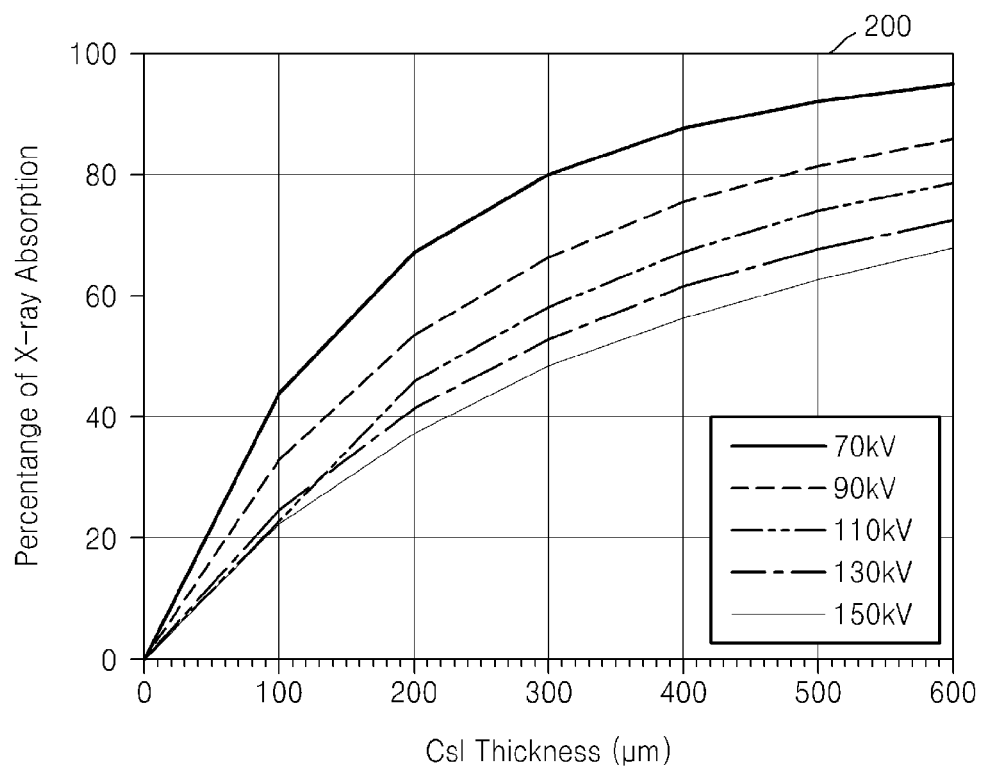
FIG. 2 is a view illustrating an x-ray absorption degree with respect to the thickness of an x-ray detector, according to the energy of the x-ray.

FIG. 2 is a view illustrating the x-ray absorption degree with respect to the thickness of an x-ray detector, according to the energy of the x-ray.

The horizontal axis illustrates the thickness of the detector (for example, CsI), and the vertical axis illustrates the x-ray absorption degree as a percentage.

CsI is a material that is used as a scintillator in the x-ray detector 30. The scintillator is a fluorescent material that emits light when radiation is absorbed, and is used in radiation detection. The material that is used as the scintillator includes NaI (T1), ZnS(Ag), CsI (T1), and LiI (T1).

As the thickness of the scintillator increases, the path along which the x-ray passes gets longer. Thus, the x-ray projected to the x-ray detector is absorbed more in the scintillator, as the thickness of the scintillator is greater. Here, the absorption degree differs according to the energy of the x-ray. As the energy of the x-ray increases, the penetrating power for the object increases, and thus, the degree of x-ray absorption in the scintillator is reduced. To generate an x-ray image, the x-ray absorption degree should be great. Therefore, to absorb the x-ray having high energy, the thickness of the scintillator should be sufficiently large.

Figure 3:
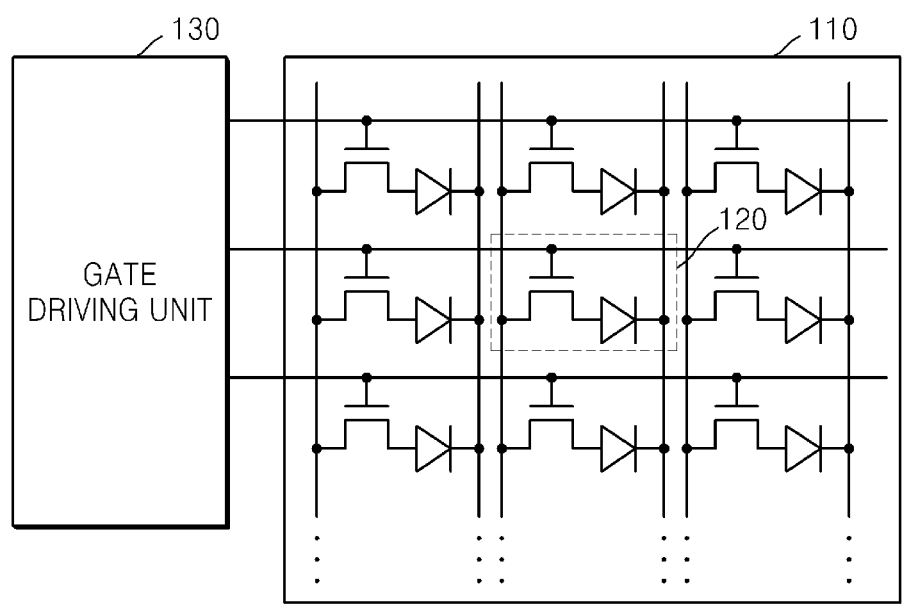
FIG. 3 is a block diagram illustrating a structure of an x-ray detector, according to an embodiment of the present invention.

FIG. 3 is a block diagram illustrating a structure of an x-ray detector, according to an embodiment of the present invention.

The x-ray detector 100 according to the present embodiment may include a first detection unit 110, a second detection unit 120, and a gate driving unit 130.

The first detection unit 110 detects an x-ray that was projected from the x-ray generator 10 and has reached the first detection unit 110 after passing through the object 20.

The second detection unit 120 detects an x-ray that has passed through the first detection unit 110. As illustrated in FIG. 2, some portion of the x-ray that reaches the first detection unit 110, is not absorbed in the scintillator of the first detection unit 110. In other words, the second detection unit 120 may detect the x-ray that has not been absorbed in the scintillator of the first detection unit 110, and has passed through the first detection unit 110.

The second detection unit 120 illustrated by a dotted line in FIG. 3, may be placed on the back of the first detection unit 110. The arrangement or specific relations between the first detection unit 110 and the second detection unit 120 will be described in detail, in reference to FIG. 5.

The gate driving unit 130 is a device for controlling a gate of the first detection unit 110, according to whether the second detection unit 120 detects the x-ray. In other words, the gate driving unit 130, based on whether the second detection unit 120 detects the x-ray that has passed through the first detection unit 110, turns on or off the gate of the first detection unit 110, for the first detection unit 110 to integrate an x-ray signal.

When the gate of the first detection unit 110 is turned on, the first detection unit 110 may not receive the x-ray signal. On the contrary, when the gate of the first detection unit 110 is turned off, the first detection unit 110 may receive the x-ray signal.

The gate driving unit 130 may apply a gate pulse for controlling a switching device of the first detection unit 110, to the first detection unit 110, in order to turn on the gate of the first detection unit 110. In other words, the gate driving unit 130 may control the gate by generating the gate pulse for controlling the on/off state of the gate of the first detection unit 110, and applying the gate pulse to the first detection unit 110.

The gate driving unit 130 may apply the gate pulse for turning off the switching device, when the second detection unit 120 detects the x-ray. On the contrary, when the second detection unit 120 does not detect the x-ray, the gate driving unit 130 may apply the gate pulse for turning on the switching device.

Figure 4:
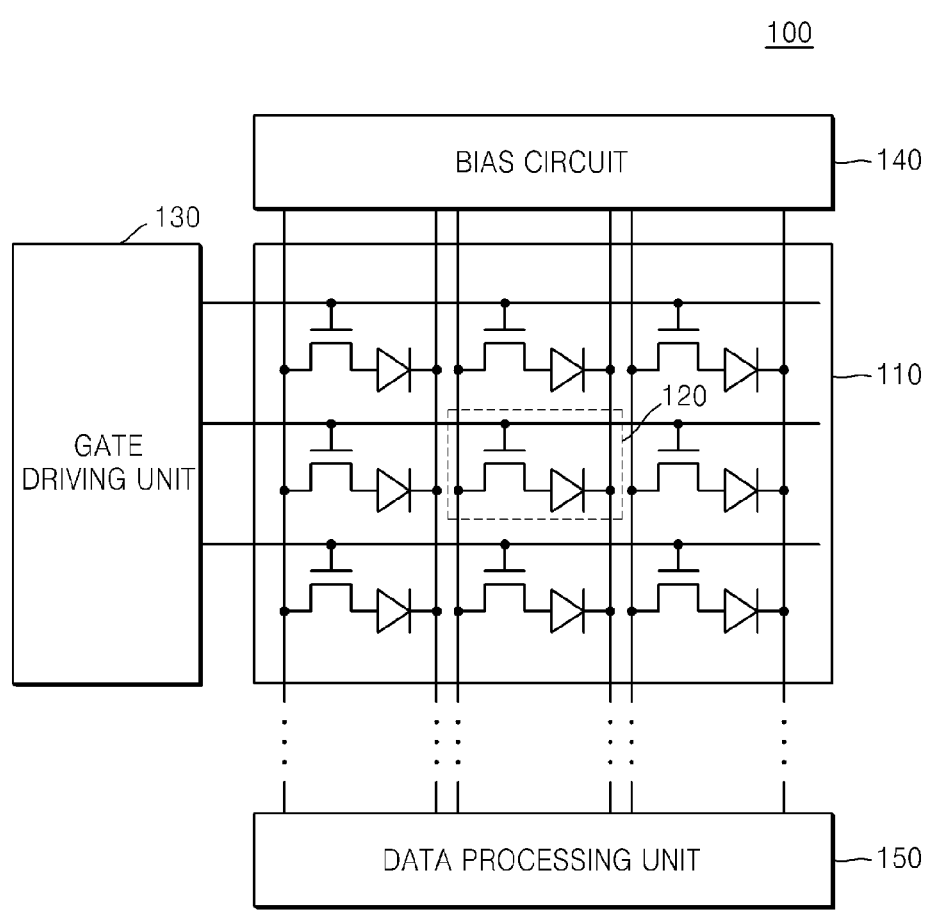
FIG. 4 is a block diagram illustrating a structure of an x-ray detector, according to another embodiment of the present invention.

FIG. 4 is a block diagram illustrating a structure of an x-ray detector, according to another embodiment of the present invention.

The x-ray detector 100 according to the present embodiment may include the first detection unit 110, the second detection unit 120, the gate driving unit 130, a bias circuit 140, and a data processing unit 150.

The first detection unit 110, the second detection unit 120, and the gate driving unit 130, illustrated in FIG. 4 are the same as illustrated in FIG. 3.

The bias circuit 140 applies a driving voltage to the first detection unit 110. In order to supply a power required to drive the gate of the first detection unit 110, the bias circuit applies the driving voltage to the first detection unit 110.

The data processing unit 150 integrates an x-ray image by collecting the x-ray signal, when the gate of the first detection unit 110 is turned off and integrates an x-ray signal. Also, the data processing unit 150 may perform an afterimage annihilation algorithm, such as a lag/ghost annihilation algorithm, for the generated x-ray image.

The data processing unit 150 may include a read-out circuit for collecting the x-ray signal. Also, the data processing unit 150 may further include an image processing unit (not shown) for generating and processing the x-ray image.

Figure 5:
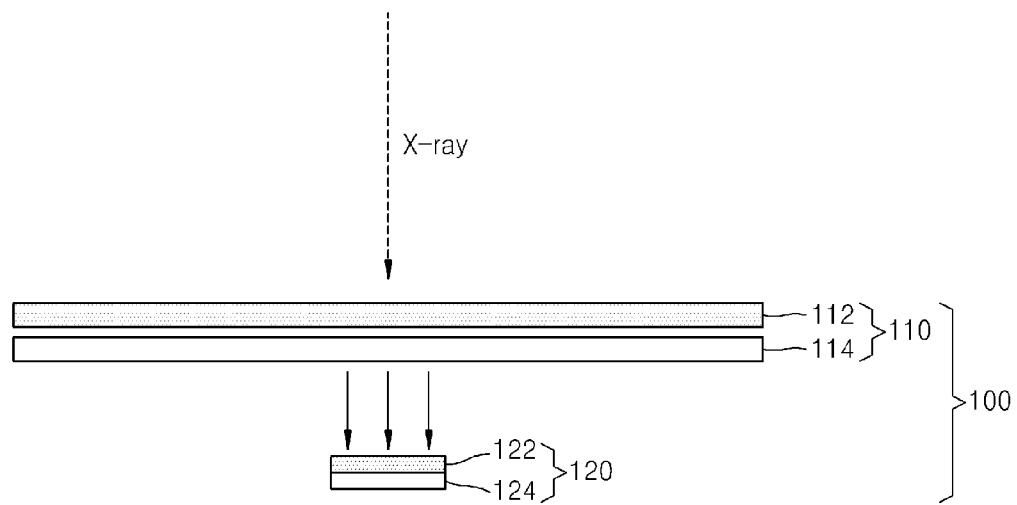
FIG. 5 is a view illustrating a first detection unit and a second detection unit, according to an embodiment of the present invention.

FIG. 5 is a view illustrating a first detection unit and a second detection unit, according to an embodiment of the present invention.

As illustrated in FIG. 5, the x-ray detector 100 may include the first detection unit 110 and the second detection unit 120, and the first detection unit 110 includes a first scintillator 112 and a TFT-PIN array 114. Also, the second detection unit 120 may include a second scintillator 122 and at least one light detection device 124. The light detection device 124 according to an embodiment of the present invention may include a photodiode.

The scintillator 112 of the first detection unit 110 is a fluorescent material that emits light when an x-ray is absorbed, and is used in radiation detection. The x-ray projected from the x-ray generator 10 is absorbed in the first scintillator 112 when it reaches the first detection unit 110 after passing through the object 20, and thus, light is emitted. The TFT-PIN array 114 is an array formed by a plurality of TFT switches and light detection devices.

Only when the TFT switch is turned off, may the light detection device detect light generated by the x-ray being absorbed in the scintillator, and the detected light is converted into an electric signal. Subsequently, the data processing unit 150 may integrate an x-ray image by using an x-ray signal that is converted into the electric signal.

On the contrary, when the TFT switch is turned on, the x-ray signal is not integrated, but is output in the data processing unit 150. As a result, the data processing unit 150 may not generate the x-ray image. That is, the wireless x-ray detector 100 may detect an x-ray, only when the TFT switch of the first detection unit 110 is turned off at the point of detecting an x-ray that is projected.

The second scintillator 122 of the second detection unit 120 is a fluorescent material that emits light when an x-ray is absorbed, and is used in radiation detection. The light detection device 124 detects light emitted from the scintillator 122 in which the x-ray is absorbed, and converts the light into an electric signal.

As the x-ray successively passes through the object 20, the x-ray having low energy is absorbed in the first scintillator 112. Accordingly, only the x-ray having high energy reaches the second detector 120. As a result, the average energy of the x-ray that has passed through the first detection unit 110 increases, compared to that before the x-ray reaches the first detection unit 110, and thus, a beam hardening phenomenon may occur.

Since the x-ray that has passed through the first detection unit 110, illustrated in FIG. 5, has a higher average energy than before the x-ray has passed through the first detection unit 110, the second detection unit 120 makes the x-ray absorption degree greater than the first detection unit 110, in order to detect the x-ray that has passed through the first detection unit 110.

For example, the second detection unit 120 may increase the x-ray absorption degree by being formed thicker than the first detection unit 110. The second detection unit 120 according to another embodiment of the present invention may include the second scintillator 122 that is thicker than the first scintillator 112. Apart from the above described embodiments of the present invention, the second detection unit 120 may further include various other configurations, in order to detect an x-ray having an increased average energy because of the beam hardening phenomenon. This will be described later in relation to FIG. 11.

Meanwhile, the first detection unit 110 and the second detection unit 120 may be realized such that both are attached to each other. That is, the second detection unit 120 may be placed closely on the back (the side opposite to the one which the x-ray reaches) of the first detection unit 110. Or, the second detection unit 120 may be placed a predetermined distance apart from the first detection unit 110. That is, the second detection unit 120 may be placed a predetermined distance apart from the first detection unit 110, in such a way that the x-ray that has passed through the first detection unit 110 is not interfered with or affected by noise.

Figure 6:
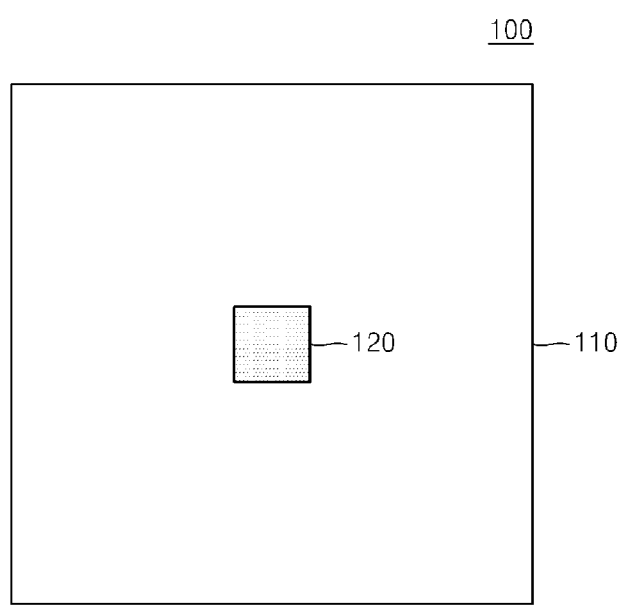
FIG. 6 is a plan view of the first detection unit and the second detection unit, according to an embodiment of the present invention.

FIG. 6 is a plan view of the first detection unit 110 and the second detection unit 120, according to an embodiment of the present invention.

As illustrated in FIG. 6, the x-ray detector 100 may include the first detection unit 110 and the second detection unit 120.

The second detection unit 120 may be placed on the back of the first detection unit 110, and have a smaller size than the first detection unit 110. On the other hand, unlike what is illustrated in FIG. 6, the second detection unit 120 may be the same size as the first detection unit 110.

The second detection unit 120 may be placed at the center of the first detection unit 110, on the back of the first detection unit 110. That is, the second detection unit may be placed such that the center of the second detection unit 120 may be the same as that of the first detection unit 110.

Figure 7:
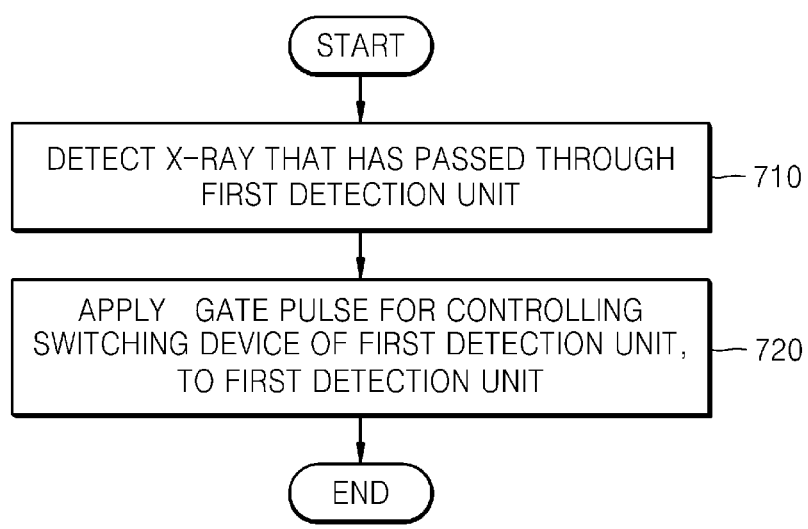
FIG. 7 is a flowchart illustrating a method of driving an x-ray detector, according to an embodiment of the present invention.
Figure 8:
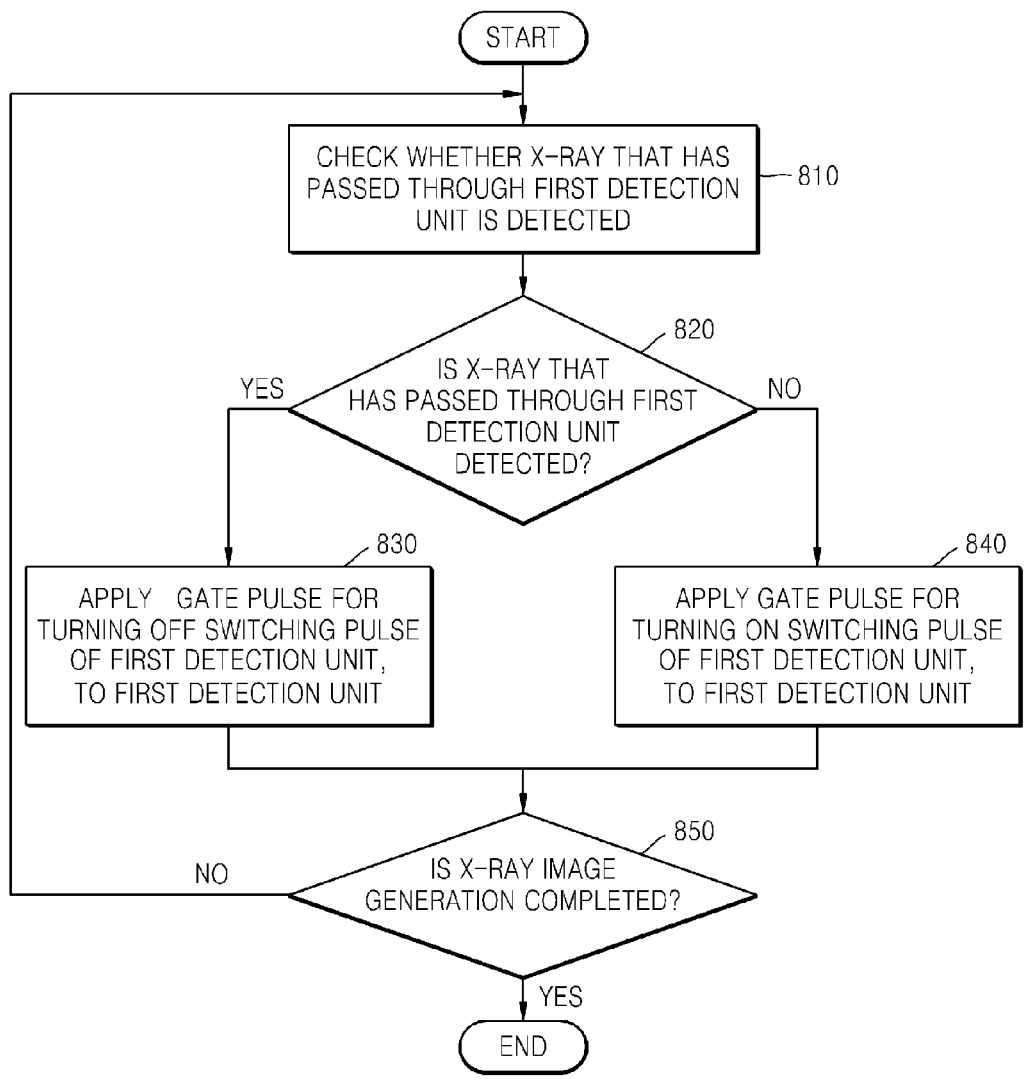
FIG. 8 is a flowchart illustrating a method of driving an x-ray detector, according to another embodiment of the present invention.
Figure 9:
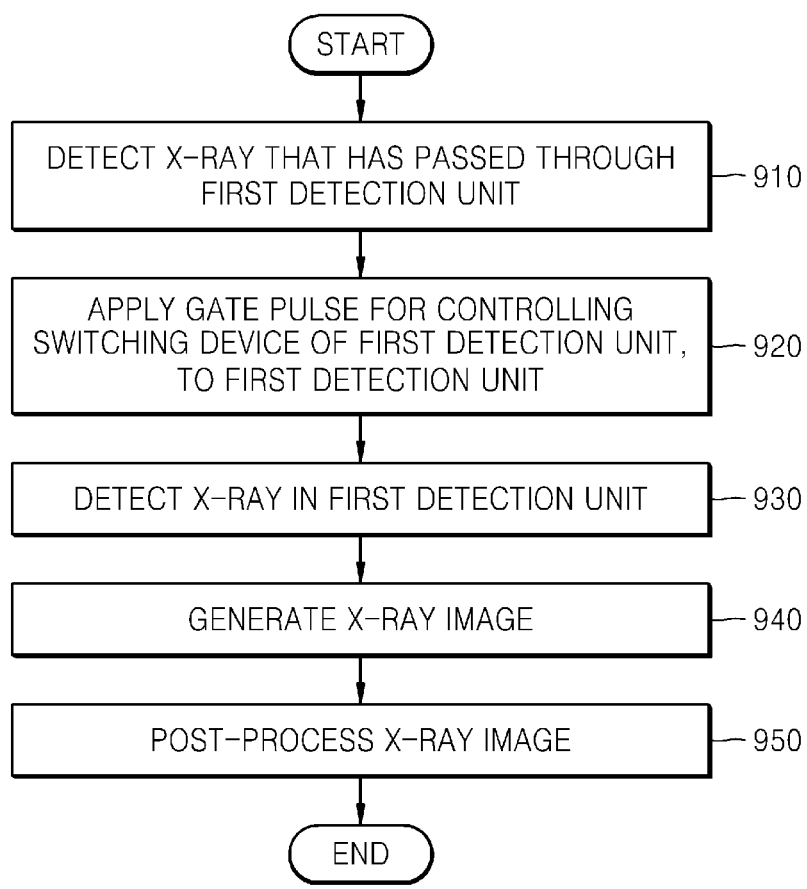
FIG. 9 is a flowchart illustrating a method of driving an x-ray detector, according to yet another embodiment of the present invention.

FIG. 7 is a flowchart illustrating a method of driving an x-ray detector, according to an embodiment of the present invention. Flowcharts illustrated in FIGS. 7 through 9 are of processes performed by the components included in the wireless x-ray detector 100, described above. Accordingly, even if the description is omitted hereinafter, it will be understood that descriptions about the configurations illustrated in FIGS. 1 through 6 may be applied to the flowcharts illustrated in FIGS. 7 through 9.

In operation 710, the second detection unit 120 of the wireless x-ray detector 100 detects the x-ray that has passed through the first detection unit 110.

In operation 720, the gate driving unit 130 applies the gate pulse for controlling the switching device of the first detection unit 110, to the first detection unit 110. That is, when the second detection unit 120 detects the x-ray that has passed through the first detection unit 110, the gate driving unit 130 may apply the gate pulse for turning off the switching device of the first detection unit 110, to the first detection unit 110. When the second detection unit 120 does not detect the x-ray that has passed through the first detection unit 110, the gate driving unit 130 may apply the gate pulse for turning on the switching device of the first detection unit 110, to the first detection unit 110.

FIG. 8 is a flowchart illustrating a method of driving an x-ray detector, according to another embodiment of the present invention.

In operation 810, the second detection unit 120 of the wireless x-ray detector 100 may detect the x-ray that has passed through the first detection unit 110.

In operation 820, the wireless x-ray detector 100 checks whether the second detection unit 120 has detected the x-ray in operation 810. If the second detection unit 120 has detected the x-ray that has passed through the first detection unit 110, the process proceeds to operation 830, and if the x-ray has not been detected, the process proceeds to operation 840.

In operation 830, if the second detection unit 120 has detected the x-ray that has passed through the first detection unit 110, the wireless x-ray detector 100 may apply the gate pulse for turning off the switching device of the first detection unit 110, to the first detection unit 110.

In operation 840, if the second detection unit 120 has not detected the x-ray that has passed through the first detection unit 110, the wireless x-ray detector 100 may apply the gate pulse for turning on the switching device of the first detection unit 110, to the first detection unit 110.

In operation 850, the wireless x-ray detector 100 checks whether a generation of an x-ray image has been completed. When the generation of the x-ray image has been completed, the detection process is finished, and when the generation of the x-ray image has not been completed, the detection process may return to operation 810.

FIG. 9 is a flowchart illustrating a method of driving an x-ray detector, according to yet another embodiment of the present invention.

In operation 910, the second detection unit 120 detects the x-ray that has passed through the first detection unit 110. Although not shown, the first detection unit 110 of the wireless x-ray detector 100 may be in a state in which the gate is turned on, in operation 910. That is, although, in operation 910, the x-ray reaches the first detection unit 110, the first detection unit 110 does not integrate the x-ray.

In operation 920, as the second detection unit 120 detects the x-ray in operation 910, the gate driving unit 130 applies the gate pulse for turning off the gate, to the first detection unit 110. Details about this aspect are the same as those described in relation to FIGS. 7 and 8.

In operation 930, the first detection unit 110 detects the x-ray that is projected. That is, in operation 920, if the gate is turned off by the gate driving unit 130, the first detection unit 110 may detect the x-ray that is projected, and may integrate an x-ray signal.

In operation 940, the wireless x-ray detector 100 generates an x-ray image by using the signal of the detected x-ray.

In operation 950, the wireless x-ray detector 100 post-processes the generated x-ray image. The wireless x-ray detector 100 according to an embodiment of the present invention may apply, as post-processing, at least one of a lag annihilation algorithm and a ghost annihilation algorithm.

Meanwhile, although it is not shown after operation 950, the wireless x-ray detector 100 may turn on the gate of the first detection unit 110 again. That is, the second detection unit 120 does not detect the x-ray that has passed through the first detection unit 110, because there is no x-ray that has reached the first detection unit 110. Accordingly, the gate driving unit 130 may turn on the gate of the first detection unit 110 again.

In other words, the wireless x-ray detector 100 may return to the state before operation 910, when the x-ray image generating process is completed. If the x-ray is projected from the x-ray generator 10 during the time when the wireless x-ray detector 100 is on standby before operation 910, the second detection unit 120 detects the x-ray, and the gate driving unit 130 integrates an x-ray signal by controlling the first detection unit 110. The wireless x-ray detector 100 may repeatedly perform the above processes.

Figure 10:
FIG. 10 is a view illustrating an operation of a switching device with respect to the detection of an x-ray, according to an embodiment of the present invention.
Figure 10:
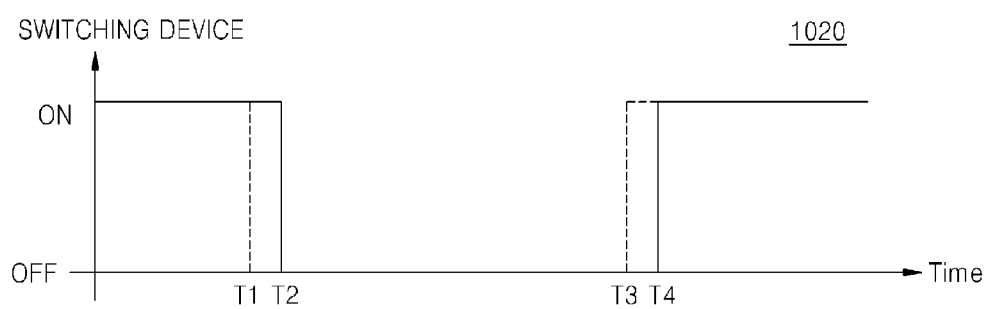

FIG. 10 is a view illustrating an operation of a switching device with respect to the detection of an x-ray, according to an embodiment of the present invention.

As illustrated in FIG. 10, graph 1010 indicates a time period during which the x-ray is projected into the wireless x-ray detector 100 from the x-ray generator 10. The x-ray is projected into the wireless x-ray detector 100 in a time period from T1 to T3.

Graph 1020 indicates a time period during which the wireless x-ray detector 100 turns on and off the first detection unit 110, as the x-ray that has passed through the first detection unit 110 is detected. If the second detection unit 120 detects the x-ray that has passed through the first detection unit 110, the gate driving unit 130 applies the gate pulse for turning off the switching device of the first detection unit 110, to the first detection unit 110, at T2.

Likewise, if the second detection unit 120 does not detect the x-ray that has passed through the first detection unit 110, the gate driving unit 130 applies the gate pulse for turning on the switching device of the first detection unit 110, to the first detection unit 110, at T4.

Meanwhile, the time period from T1 though T3, in which the x-ray generator 10 projects the x-ray, and the time period from T2 through T4, in which the switching device of the first detection unit 110 is turned off, may not be exactly the same.

This is because, when the switching devices of all of the gates of the first detection unit 110 are turned on or off, the gates may be turned on or off in an order of the gate placed closer to the gate driving unit 130, because of a resistive-capacitive (RC) delay of wirings of the gate driving unit 130.

That is, the time period from the point when the first gate of the first detection unit 110 is turned off to the point when the last gate of the first detection unit 110 is turned off may be within a predetermined critical time. The critical time according to an embodiment of the present invention may be 20 µs or less. In the illustrated embodiment of the present invention, the time period from T1 through T3, and the time period from T2 through T4 may correspond to the critical time.

Since most projection times of the x-ray are about 10 ms, a loss of the x-ray during the critical time may have an effect that is negligible in terms of the entire image. In operation 840, if the second detection unit 120 has not detected the x-ray that has passed through the first detection unit 110, the wireless x-ray detector 100 may apply the gate pulse for turning on the switching device of the first detection unit 110, to the first detection unit 110.

Thus, the wireless x-ray detector 100 may apply the gate pulse to the first detection unit 110, within a predetermined critical time from the point in which the x-ray is projected.

Figure 11:
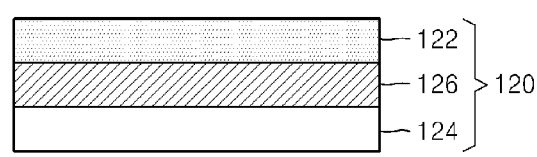
FIG. 11 is a view illustrating a wireless x-ray detector, according to an embodiment of the present invention.

FIG. 11 is a view illustrating a wireless x-ray detector, according to an embodiment of the present invention.

As illustrated in FIG. 11, the scintillator 122 of the second detection unit 120 is a fluorescent material that emits light when an x-ray is absorbed, and is used in radiation detection. The light detection device 124 detects light emitted from the scintillator 122 to which the x-ray is absorbed, and converts the light into an electric signal. The light detection device 124 may include a photodiode.

The wireless x-ray detector 100 may include a solid state photo multiplier tube 126 between the scintillator 122 and the light detection device 124, in order to enhance the x-ray detection function.

The light detection device 124 included in the wireless x-ray detector 100 according to another embodiment of the present invention, may include a silicon photo multiplier (SiPM), in order to enhance the x-ray detection function.

The SiPM is a type of photodiode using internal amplification of a device. A general photodiode amplifies the absorbed light signal by using an external amplification circuit, but in this case, amplification of external noise may occur. The SiPM is a device that may measure a photon, because the SiPM may amplify the signal by a million times within the device.

As described above, according to the one or more of the above embodiments of the present invention, immediate and efficient detection of x-ray exposure may be possible. In other words, regardless of when the x-ray projection starts, the x-ray detection may be started without a communication delay, and thus, a reliable result of the x-ray detection may be obtained.

Also, without an installation of any additional wirings or communication devices in an x-ray diagnosis system including the x-ray generator 10 and the wireless x-ray detector 100, the wireless x-ray detector 100 and the x-ray generator 10 may be synchronized.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims Although a few embodiments have been shown and described, it would be appreciated by those skilled in the art that changes may be made in these embodiments without departing from the principles and spirit of the invention, the scope of which is defined in the claims and their equivalents.

What is claimed is:

1. An x-ray detector comprising:
   a first detection unit for detecting an x-ray incident in the x-ray detector;
   a second detection unit for detecting an x-ray that has passed through the first detection unit; and
   a gate driving unit for applying a gate pulse for controlling a switching device of the first detection unit, to the first detection unit, according to whether the second detection unit detects the x-ray that has passed through the first detection unit.

2. The x-ray detector of claim 1, wherein the second detection unit is placed on the back of the first detection unit, and has a same center position as that of the first detection unit.

3. The x-ray detector of claim 1, wherein the second detection unit detects an x-ray having a higher average energy than an x-ray detected by the first detection unit.

4. The x-ray detector of claim 1, wherein the gate driving unit applies a gate pulse for turning off the switching device, when the second detection unit detects the x-ray that has passed through the first detection unit.

5. The x-ray detector of claim 1, wherein the gate driving unit applies a gate pulse for turning on the switching device, when the second detection unit does not detect the x-ray that has passed through the first detection unit.

6. The x-ray detector of claim 1, wherein the first detection unit includes a plurality of light detection devices, and the gate driving unit applies the gate pulse to the plurality of light detection devices within a predetermined critical time.

7. The x-ray detector of claim 1, wherein the x-ray detector receives a detection signal output from the first detection unit, and further includes a data processing unit for generating an x-ray image, based on the detection signal.

8. The x-ray detector of claim 7, wherein the data processing unit performs an afterimage annihilation algorithm for the x-ray image.

9. The x-ray detector of claim 1, wherein the second detection unit includes a plurality of light detection devices, and the light detection devices include a silicon photo multiplier (SiPM).

10. The x-ray detector of claim 1, wherein the second detection unit includes a solid state photo multiplier tube.

11. The x-ray detector of claim 1, further comprising:
a bias circuit to supply a bias voltage to the first detection unit.

12. The x-ray detector of claim 1, wherein the first detection unit includes a first scintillator and a T-Fit-Pin array.

13. The x-ray detector of claim 1, wherein the first detection unit includes a first scintillator and the second detection unit includes a second scintillator which is thicker than the first scintillator.

14. A method of driving an x-ray detector, the method comprising:
detecting, by a second detection unit, an x-ray that has passed through a first detection unit for detecting an x-ray incident in the x-ray detector; and
controlling a gate pulse applied to the first detection unit, as the x-ray that has passed through the first detection unit is detected.

15. The method of claim 14, wherein the second detection unit for detecting the x-ray that has passed through the first detection unit, is placed on the back of the first detection unit, and has a same center position as that of the first detection unit.

16. The method of claim 14, wherein the detecting of the x-ray comprises detecting an x-ray, by the second detection unit, having a higher average energy than an x-ray detected by the first detection unit.

17. The method of claim 14, wherein the controlling of the gate pulse comprises applying a gate pulse for turning off a switching device of the first detection unit, when the x-ray that has passed through the first detection unit is detected in the process of detecting the x-ray.

18. The method of claim 14, wherein the controlling of the gate pulse comprises applying a gate pulse for turning on a switching device of the first detection unit, when the x-ray that has passed through the first detection unit is not detected in the process of detecting the x-ray.

19. The method of claim 14, wherein the first detection unit comprises a plurality of light detection devices, and the controlling of the gate pulse comprises applying the gate pulse to the plurality of light detection devices within a predetermined critical time.

20. The method of claim 14, further comprising:
receiving a detection signal output from the first detection unit; and
processing x-ray image generating data, based on the detection signal.

21. The method of claim 20, wherein the processing of the data comprises performing an afterimage annihilation algorithm for the x-ray image.

22. The method of claim 14, wherein the detecting of the x-ray comprises detecting the x-ray by using a plurality of light detection devices, and the light detection devices include a silicon photo multiplier (SiPM).

23. The method of claim 14, wherein the detecting of the x-ray comprises using a solid state photo multiplier tube.

24. An x-ray detector comprising:
a first detection unit for detecting an x-ray incident in the x-ray detector;
a second detection unit for detecting an x-ray that has passed through the first detection unit;
a bias circuit for applying a driving voltage to the first detection unit;
a read-out circuit for receiving a detection signal output from the first detection unit; and
a gate driving unit for applying a gate pulse for controlling a switching device of the first detection unit, to the first detection unit, according to whether the second detection unit detects the x-ray that has passed through the first detection unit.

* * * * *